April 7, 1953     M. SNYDER     2,633,601
METHOD OF PREPARING FOWL
Filed Dec. 2, 1950
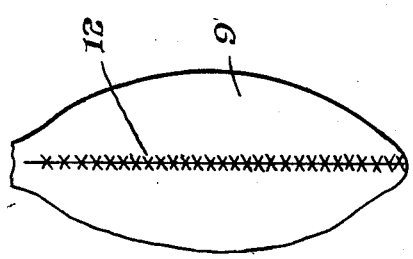
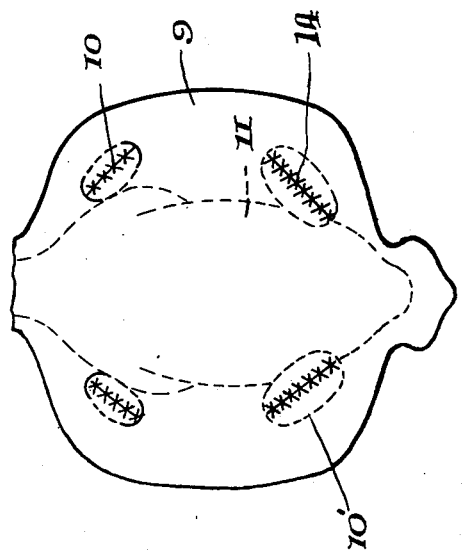
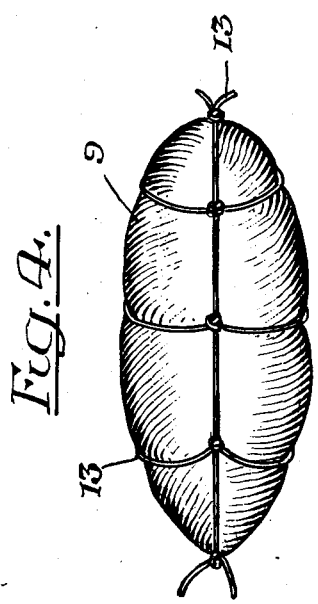
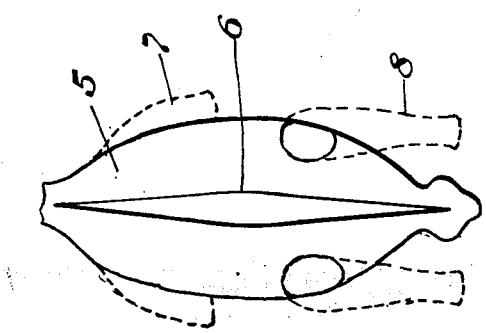
INVENTOR
Marty Snyder
BY
Cousins & Cousins
ATTORNEYS.

Patented Apr. 7, 1953

2,633,601

UNITED STATES PATENT OFFICE 2,633,601

METHOD OF PREPARING FOWL

Marty Snyder, New York, N. Y.

Application December 2, 1950, Serial No. 198,854

4 Claims. (Cl. 17—45)

This invention relates to a method of processing fowl for human consumption. While the method is particularly adapted for the processing of turkeys, it may be employed with equal advantage in the preparation of other types of fowl.

Turkey or other fowl is frequently stripped of the meat which is then reduced to small pieces, and thereafter placed in cans or jars commonly labeled "boned turkey."

In other instances fowl is boned so that the flesh is maintained in one continuous piece and then forced into a preshaped can for eventual sale. Both of these known techniques have proven unsatisfactory, since they lack the flavor and succulence of roasted meat.

The primary object of the present invention is to provide a boned fowl which may be enclosed in its own skin, and thereafter cooked and then refrigerated until ready for sale.

A feature of the present invention lies in skinning the fowl and later using the original skin as a covering for the flesh after the boning operation has been completed.

The invention consists of the steps of the method, as hereinafter illustrated, described and claimed.

In the accompanying drawings, forming a part hereof, the figures are intended as illustrative of the steps of the method.

Referring to the drawings:

Figure 1 is a plan view of the carcass of a fowl taken from the breast or bottom side, with certain portions shown in dashed lines for the sake of clarity.

Figure 2 is a plan view of the skin after being removed, with the boned flesh to be placed therein shown in dotted lines.

Figure 3 is a plan view showing the original skin sewn together to enclose the flesh.

Figure 4 is a view in side elevation of the boned fowl trussed with twine to insure retention of its shape during the cooking process and until it is ready for use.

Referring to the drawings, 5 indicates a fowl which has been decapitated and plucked. In the preferred use of the method, the wings 7 are first removed. The skin 9 of the fowl is then split lengthwise, as indicated at 6 in Figure 1, starting from a point at the tip of the breast bone. The skin 9 is then worked away from the flesh 11 by hand, until the first joint 8, or "drum stick" of the fowl is reached. At this point the first joint 8 is separated from the body and may elsewhere be used or sold separately.

As shown in Figure 2, the skinning operation leaves a piece of skin 9 having openings 10, 10' therein, where the wings and first joint of the legs previously had been. These openings are closed by stitching 14 so as to present a continuous skin in which the flesh will be enclosed.

The fowl is then eviscerated and boned in the usual manner, with caution being taken to keep all of the flesh 11, including the second joint of the legs intact. The flesh 11 is then seasoned and placed upon the original skin 9, as indicated by the dashed lines in Figure 2. The skin 9 is then wrapped securely around the flesh 11. Any surplus skin is trimmed off.

The skin 9 is then sewn together, as indicated at 12 in Figure 3. Thereafter, the complete, boneless fowl is trussed with butcher's twine 13, as indicated in Figure 4, so as to retain its shape during subsequent cooking.

The fowl then may be roasted in thermostatically-controlled ovens until done. Thereafter, the fowl may be chilled and refrigerated.

As variations of the method, it is possible to skin and bone the entire fowl, including both the wings and the first joint of the legs. It will be borne in mind that in selling merchandise of this character, the eye-appeal to the purchaser is important. When the finished fowl reaches the table for ultimate consumption, it can be served either hot or cold. Being entirely boneless, it does not require a skillful carver to slice the meat.

As another variation of the method, any suitable dressing or stuffing may be placed within the natural cavity in the flesh, before the skin is applied. Where this is done, the end result, upon slicing, is a circle of boneless fowl having a center of dressing, which is attractive, whether served hot or cold.

Having thus fully described the invention, what is claimed as new and desired to be secured by Letters Patent of the United States, is:

1. The method of processing dressed fowl which consists in making a slit in the skin lengthwise thereof, removing the wings and legs, skinning the fowl so as to remove the skin entirely from the flesh and preserve the said skin in one piece, closing all apertures in the skin including those left by removing the wings and legs, removing the flesh from the bones of the fowl in a substantially intact state and thereafter completely encasing the boned flesh within the skin of the fowl and closing said slit.

2. The method of processing dressed fowl which consists in making a slit in the skin lengthwise thereof, removing the wings and legs, skinning the fowl so as to remove the skin entirely from the flesh and preserve the said skin in one piece, closing all apertures in the skin including those left by removing the wings and legs, removing the flesh from the bones of the fowl in a substantially intact state and thereafter completely encasing the white meat within the skin of the fowl and closing said slit.

3. The method of processing dressed fowl which consists in making a slit in the skin lengthwise thereof, removing the wings and legs, skinning the fowl so as to remove the skin entirely from the flesh and preserve the said skin in one piece, closing all apertures in the skin including those left by removing the wings and legs, removing the flesh from the bones of the fowl in a substantially intact state and thereafter completely encasing the dark meat within the skin of the fowl and closing said slit.

4. The method of processing dressed fowl which consists in making a slit in the skin lengthwise thereof, removing the wings and legs, skinning the fowl so as to remove the skin entirely from the flesh and preserve the said skin in one piece, closing all apertures in the skin including those left by removing the wings and legs, removing the flesh from the bones of the fowl in a substantially intact state and thereafter completely encasing the selected proportions of light and dark meat within the skin of the fowl and closing said slit.

MARTY SNYDER.

REFERENCES CITED

The following references are of record in the file of this patent:

UNITED STATES PATENTS

| Number | Name | Date |
|--------|------|------|
| 1,433,628 | Knaust | Oct. 31, 1922 |
| 2,267,442 | Clark | Dec. 23, 1941 |
| 2,571,544 | Cutrera | Oct. 16, 1951 |

OTHER REFERENCES

"Turkey Logs" by David W. Evans in the U. S. Egg and Poultry Magazine for January 1950, pages 9, 10 and 24.

"Turkey Logs" in the U. S. Egg and Poultry Magazine for February 1951, pages 52 and 53.